United States Patent [19]

Kalaugher

[11] E Patent Number: Re. 32,487

[45] Reissued Date of Patent: Sep. 1, 1987

[54] BINOCULAR PRESENTATION OF VISUAL INFORMATION

[75] Inventor: Patrick G. Kalaugher, Exmouth, England

[73] Assignee: University of Exeter, Devon, England

[21] Appl. No.: 886,030

[22] Filed: Jul. 16, 1986

Related U.S. Patent Documents

Reissue of:

[64] Patent No.: 4,521,074
Issued: Jun. 4, 1985
Appl. No.: 457,515
Filed: Jan. 13, 1883

[30] Foreign Application Priority Data

Jan. 22, 1982 [GB] United Kingdom ..... 8201842

[51] Int. Cl.[4] ..... G02B 27/02

[52] U.S. Cl. ..... 350/145; 350/143; 356/394; 356/389; 434/331; 273/1 G

[58] Field of Search ..... 350/130, 131, 133–136, 350/143, 144, 145, 146, 320, 321; 356/389–394; 273/1 G, 1 GE; 434/331

[56] References Cited

U.S. PATENT DOCUMENTS

| | | | |
|---|---|---|---|
| 3,146,663 | 9/1964 | Kirkconnell et al. | 434/157 |
| 3,188,760 | 6/1965 | Miller et al. | 350/145 |
| 3,471,148 | 10/1969 | Janiszewski et al. | 273/1 GE |
| 3,744,917 | 7/1973 | Craig | 356/394 |
| 3,857,640 | 12/1974 | Hilboh | 356/389 |
| 4,026,631 | 5/1977 | Erb | 350/35 |
| 4,257,691 | 3/1981 | Brooks | 350/145 |

FOREIGN PATENT DOCUMENTS

| | | | |
|---|---|---|---|
| 869419 | 7/1949 | Fed. Rep. of Germany . | |
| 11039612 | 11/1961 | Fed. Rep. of Germany . | |
| 2319914 | 2/1977 | France . | |
| 517063 | 2/1955 | Italy | 350/133 |
| 15006 | of 1900 | United Kingdom | 350/578 |
| 662987 | 12/1951 | United Kingdom . | |
| 1264343 | 2/1972 | United Kingdom . | |
| 1264409 | 2/1972 | United Kingdom . | |
| 1481242 | 7/1977 | United Kingdom . | |
| 1533859 | 11/1978 | United Kingdom . | |
| 1577068 | 10/1980 | United Kingdom . | |
| 1581926 | 12/1980 | United Kingdom . | |
| 1588351 | 4/1981 | United Kingdom . | |
| 2062285A | 5/1981 | United Kingdom . | |

OTHER PUBLICATIONS

Walter Grutzmann, No. 2568, p. 91, May, 1941.

Ogle, K. N., "Special Topics in Binocular Spatial Localization" in *The Eye*, vol. 4, edited by H. Davson, p. 395, Academic Press (London), 1962.

Valyus, N. A., *Stereoscopy, pp. 289–290, Focal Press (London) 1962.*

Brewster, D., *The Stereoscope*, pp. 154–155, John Murray (London), 1962.

*Primary Examiner*—Jon W. Henry

*Attorney, Agent, or Firm*—Larson and Taylor

[57] ABSTRACT

Pairs of images are presented to an observer under conditions such that they are perceived as a single image and provide information about their mutual relationship. The pair are derived from non-equivalent image means, e.g. from (a) a photograph of a scene subject to change and (b) direct viewing of the changed scene. They are generally presented simultaneously to respective eyes. Intermittent alternate occlusion of the images highlights differences. The image pairs may constitute movie or television displays to provide 3-dimensional effects.

6 Claims, 14 Drawing Figures

BINOCULAR PRESENTATION OF VISUAL INFORMATION

Matter enclosed in heavy brackets [ ] appears in the original patent but forms no part of this reissue specification; matter printed in italics indicates the additions made by reissue.

BACKGROUND OF THE INVENTION

The present invention relates to the display and interpretation of visual data. It particularly relates to a method and apparatus for providing an observer with pairs of images so that information is derivable from a pair which is not (or not so easily) derivable from the individual images. The information may be consciously recognised as such by the observer (e.g. information about differences between the images of a pair), or subconsciously assimilated (e.g. when the images constitute a stereoscopic pair, so that the brain derives information to create a single 3-dimensional perceived image). Of course, the conscious and subconscious processes may occur simultaneously.

It is known to provide a stereoscopic pair of images, by means of a pair of similar photographs which show the same scene from "left" and "right" viewpoints a few centimeters apart (the spacing being similar to the spacing of the eyes). The "left" photograph is presented to an observer's left eye, and simultaneously the "right" photograph is presented to his right eye to enable him to perceive not two separate images but a single, fused, image, which appears 3-dimensional. In such known techniques, care is always taken that the two photographs should be identical (except for the difference in viewpoint), and should be viewed under identical conditions by means of a pair of identical viewing systems, one for each of the observer's eyes. Thus only specially prepared pairs of photographs are usable, and an observer must view these in psychological isolation, cut off from the surroundings.

Also known is apparatus for comparing small manufactured articles with a standard article to detect flaws. The apparatus has an optical system (basically a binocular microscope) through which an observer can view selectively either the standard article or a test article, and can switch between the two of them. If the two articles are arranged so that the observer receives images of them which are substantially identical (in position, size, brightness and so on), then the flaws may be quite easily detected. But it is extremely time-consuming to set up the apparatus so that the two images sufficiently approach identity of position etc.

SUMMARY OF THE INVENTION

According to the present invention in a first aspect there is provided a method for displaying visual information concerning the mutual relationship of two images, the method comprising presenting first and second said images under conditions such that they are perceivable by an observer as a single image, said first and second images being derived from non-equivalent image means.

Generally, the two images are presented simultaneously to different ones of the observer's eyes.

The first image may be derived by viewing an actual scene or object, while the second image is provided by a recorded image, whereby the observer can detect differences between the two images. For example, the recorded image may depict a scene subject to change, e.g. a landscape including a landslip. This is then fused with subsequent direct viewing of the actual scene. Differences between the images (e.g. due to movement of the landslip) can then be detected readily. A technique for facilitating this is to occlude the images intermittently, which causes the changed features to reveal themselves by flickering or apparent movement.

In another type of embodiment, one image is a photograph of a manufactured object, and this is fused with an observation of an actual object to detect manufacturing imperfections therein.

Much of the success in many applications of the present invention arises from our discoveries that (a) matching of images can be achieved even when there are quite substantial differences between them (this is discussed more fully below); and (b) there can be considerable advantages to the observer if at least one of the images is clearly related to the view that would be expected in the absence of an artificial optical system. For example, the subjective impression gained by fusing a photograph with a direct view of the scene is very different from that gained by viewing a stereo pair of photographs out of context. If further image elements are added to a recorded image (e.g. a proposed building is drawn on a photograph of a scene), on viewing the fused image of the altered photograph and the actual scene and then occluding the direct view, the observer receives a natural impression of scene with the added image elements. Even greater realism is obtainable by viewing in situ a pair of altered images.

Point (b) is also relevant to a class of embodiment which provides 3-dimensional viewing of television, films or the like. Here, a conventional display may be provided by a T.V. or cinema screen. An observer views this with one eye, while viewing with the other a small, individual screen providing complementary images to create stereo pairs. This is remarkablv more comfortable for the observer than viewing two individual images, like peering into a binocular microscope, which is an uncomfortable, selfisolating activity not endurable for long. In contrast, an observer employing the present invention can remain comfortable and still feel part of his (e.g. domestic) surroundings. A further advantage is that the single eye image can be of quite poor quality and still adequately add 3-D to the perceived image. Additionally, the size of the recorded or individual eye image can be adjusted to the other image simply by moving towards or away from the source thereof.

In a further aspect the invention provides apparatus for use in performing a method according to the invention.

BRIEF DESCRIPTION OF THE DRAWINGS

By way of example and to facilitate the exposition, some embodiments of the invention will now be described in greater detail with reference to the accompanying drawings in which:

FIG. 2 shows a viewer embodying the invention;

DESCRIPTION OF THE PREFERRED EMBODIMENTS

Figure 1A:
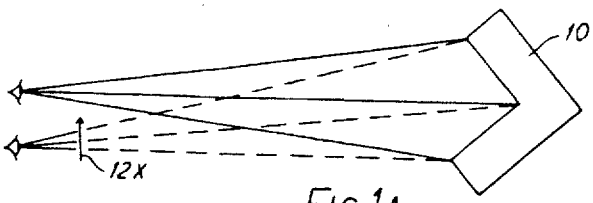
FIG. 1 schematically compares a method embodying the invention (FIG. 1A) with a known method of viewing a stereo pair of images (FIG. 1B)
Figure 1B:
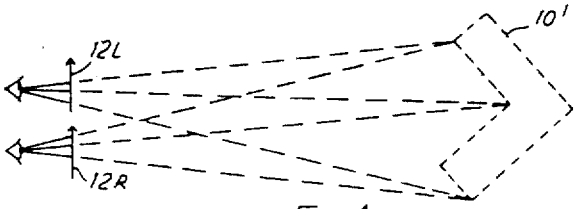
FIG. 1B PRIOR ART

FIGS. 1A and 1B show ways of mentally receiving an optical image of a 3-dimensional object 10. In the method of FIG. 1B, a 3-dimensional virtual image 10' is created by means of a conventional stereo pair of photographs 12R,12L. These are viewed by an observer so that each eye views a different one of them, the eyes being focused on the virtual image 10' at a distance L. In the method of FIG. 1A, which embodies the present invention, one eye views a photograph 12X, which may be identical to the photograph viewed by the corresponding eye in FIG. 1B, while the other eye views the object 10 directly. The recorded image on the photograph 12X is presented so as to be equal in scale to the direct view of the object 10 seen by the other eye. The observer in FIG. 1A receives individual eye images substantially identical to those received by the observer in FIG. 1B. To achieve this result, ideally the observer in FIG. 1A is placed so that the photograph-viewing eye is positioned where a camera was positioned to take the photograph 12X. The direct-viewing eye is then where the camera would have been positioned to take a second photograph to form an orthostereoscopic pair with the photograph 12X. Ideally the photograph 12X (which may be a transparency) is arranged to correspond as closely as possible with the directly-viewed image not only in size but also in brightness and colour.

If the observer knows exactly where the photograph 12X was taken, it is easy for him to find the correct viewing position. Otherwise he can find it empirically by viewing as shown in FIG. 1A, and moving until the greatest similarity of the two individual eye images is achieved, so that fusion occurs easily. An estimate of the correctness of the position can be found by observing the fused image and intermittently interrupting the image supplied to one eye. If the individual eye images are essentially identical (differing only as the pair 12R and 12L), then this has little apparent effect: just as when one views a scene directly and winks one eye (there being some apparent movement due to parallax effects). However, the greater the difference between the individual eye images, the greater the effect of interruption. As illustrated, the observer in FIG. 1A will perceive a 3-dimensional image as in FIG. 1B. However, if he moves so that the directly viewed image is identical to the recorded image (and not its "stereo pair"), fusion will give a flatter perceived image, and intermittent interruption of each image in turn will have no apparent effect.

This method can thus be used to locate the position and orientation of the camera used to take the photograph.

The apparatus can be used for experiments in the psychology of vision. E.g. the effective distance between the observer's eyes can be varied by moving so that the directly viewed image changes. Perspective reversal can be studied by viewing the photograph with the "wrong" eye.

Figure 2B:
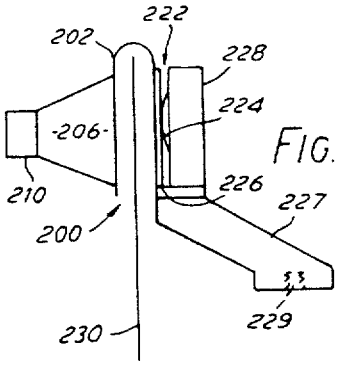
FIG. 2B is a vertical section along the axis of the focusing lens.
Figure 2A:
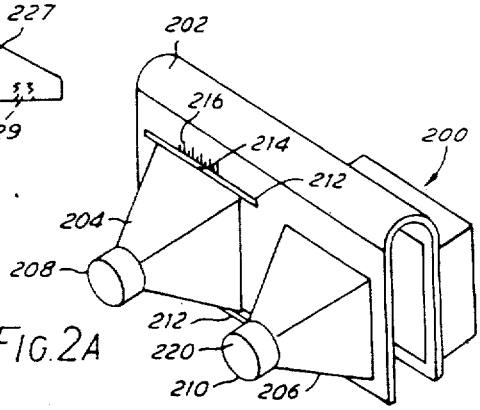
FIG. 2A is a perspective view.

FIGS. 2A and 2B show a practical embodiment of the invention. A binocular viewer 200 has an elongate body 202 whose cross-section is an inverted "u". The arms of the body 202 are penetrated by two pairs of apertures. At the rear face the apertures are covered by frustopyramidal housings 204,206 on which are mounted eyepieces 208,210. The left-hand housing 204 is mounted to the body 202 by means of upper and lower lateral flanges which engage under rims 212 on the body 202 so as to be laterally slidable. Its flanges are resiliently gripped by the rims 212 so that the housing 204 remains stably in a sliding position until a force sufficient to overcome the friction is applied to it. It bears a cursor line 214 adjacent a scale 216 on the body 202, so that its position can be recorded and re-established when necessary.

The right-hand eyepiece 210 contains a lens 220 which is mounted so as to be displaceable forwardly and rearwardly for focusing, and to be removable for replacement.

At the front face of the body 202, a slide carrier 222 is located in front of the aperture at the right (in FIG. 2A). The carrier has slide-engaging ledges on the two sides and at the bottom, and is open at the top for the insertion of a slide (transparency), in a conventional mount. Leaf springs 224 press against the sides of the mount 226 of a slide to locate it positively against the body 202, with the actual transparency substantially in register with the aperture (see FIG. 2B). Beneath the carrier 222 a support limb 227 extends downwardly and forwardly to a mount having a threaded aperture 229 for engagement with the screw fitting of a standard photographic tripod.

In front of the slide, a light diffuser 228 is mounted to the carrier 222. An electric illumination system may be fitted over or in place of the diffuser 228.

The other aperture at the front face of the body 202 may also be provided with a carrier 222'. However it is important that nothing should obstruct the view through this aperture via the viewer 208—and this places limitations on the elements located forwardly of the body 202, notably an illumination system for the slide. A left-hand carrier 222' must be coupled with the housing 204 to slide with it. The roles of the two eyes may be interchangeable by swapping eyepieces 208,210, diffuser 228 etc.

In use, the observer views a scene directly with his left eye via dummy eyepiece 208, and a slide view of the same scene (taken from essentially the same viewpoint) is inserted in the carrier 222. The lens 220 may be focused so that the observer's two eyes view respective images at the same effective distances. This allows prolonged use of the viewer without eyestrain. Once fusion of the images has been achieved, they may be compared by intermittently interrupting each of them in turn. This may be effected by waving a card 230 to and fro within the U-shaped body 202 between the two pairs of apertures. If the images are substantially identical except for some small detail, this will be clearly apparent. For example, if the scene is a landscape and, since the photograph was taken, a rock has moved slightly, then the interruption will give a stationary fused image in which the rock is seen to jump to and fro.

A still simpler apparatus (not illustrated) consists essentially of the right-hand half of the apparatus of FIG. 2A. It is a monocular slide viewer, allowing the left eye a direct view of the scene. It preferably has a transverse slot for a slider which can block the view through the viewer or be slid leftwards to block the direct view. Preferably the viewer can also receive filters, such as neutral density filters. It is also helpful if some variation in focal length is possible. (This is true of most embodiments. Even if all of the slides to be viewed are taken with the same camera lens, the size of the recorded image varies with the focusing of the camera lens, being smallest when this is focused at infinity. It is helpful if the viewer can compensate for this.)

Figure 3:
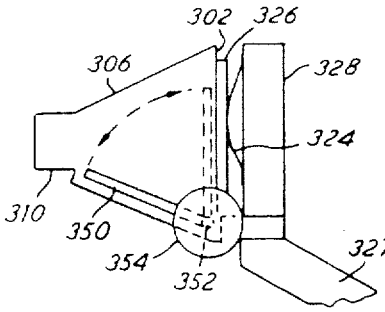
FIG. 3 is a view similar to FIG. 2B but showing a second embodiment.

FIG. 3 shows a viewer generally similar to that of FIGS. 2A nd 2B, and equivalent components have like reference numerals raised by 100. It differs in having a more sophisticated system for interrupting an image. Thus, each of the housings (304,306) contains a shutter 350 large enough (to obscure the view through the apertures via the respective eyepiece 308,310. This shutter is pivoted about its lower edge and the pivot pin 352 extends externally of the housing 306 and bears a knurled knob 354 by means of which the shutter is displaceable between a first configuration in which it lies against a pyramidal wall of the housing and does not obstruct vision, and a second configuration (shown in broken lines) in which it closes off the aperture. In this embodiment, the body 302 can be a simple apertured member.

Figure 4:
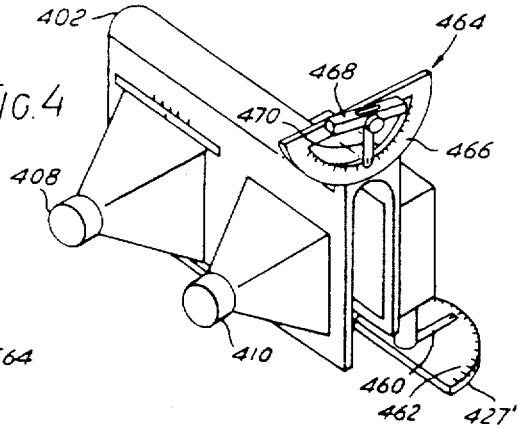
FIG. 4 is a view similar to FIG. 2A showing the viewer of FIG. 2 with additional components.
Figure 5:
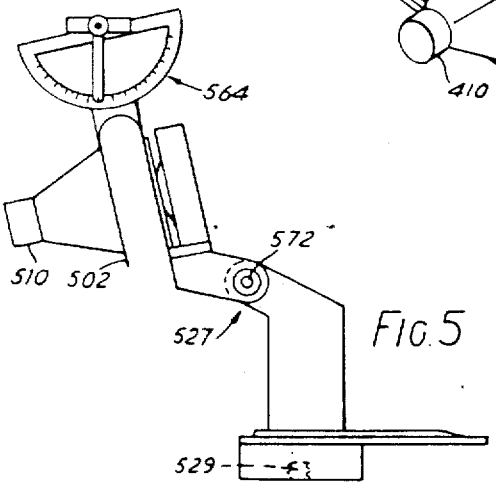
FIG. 5 is a side elevation of a viewer similar to that of FIG. 4 with an articulated mounting arm.

FIGS. 4 and 5 show viewers generally as shown in FIGS. 2A and 2B, but provided with calibration means for angles. Elements corresponding to elements shown in earlier Figures have similar numbers but in the series beginning at 400 (FIG. 4) or 500 (FIG. 5).

As seen in FIG. 4, the viewer body 402 is pivotally connected to a support limb 427', with an upright pivot axis. A pointer 460 is rotationally fast with the body 402, and a protractor scale 462 is fast with the limb 427' and disposed so that the relative angular positions of the body 402 and the limb 427' can be read off. At an upper region of the body 402 there is mounted an inclinometer 464 for determining the inclination of the body 402 to the horizontal in one vertical plane (which is variable by pivoting about the limb 427). The inclinometer includes a protractor scale 466 secured to the body 402 in an upright plane, and having a diametric bar to which is pivoted a spirit level 468 carrying a pointer 470. In use, the level 468 is pivoted until it shows that it is horizontal. This pivoting sweeps the pointer 470 across the scale 466, and its final position is read.

As seen in FIG. 5, the support limb 527 may have an intermediate articulation 572 to allow pivoting in an upright plane.

The calibration means may be used to assist in positioning the viewer so that the direct view (seen through the eyepiece 408 or 508) is observed at the same bearing and inclination as the camera which took the photograph being viewed through the other eyepiece. Alternatively if the viewer is being used to locate the viewpoint from which a photograph was taken, once this has been done (i.e. the viewer has been positioned so that intermittent interruption of one image has negligible effect), the scales can be read to provide partial characterisation of the view. The angle subtended by a displacement can readily be found. (Ideally all pivoting should be about the nodal point of the observer's eye, but minor deviations from this are generally acceptable.)

Figure 6A:
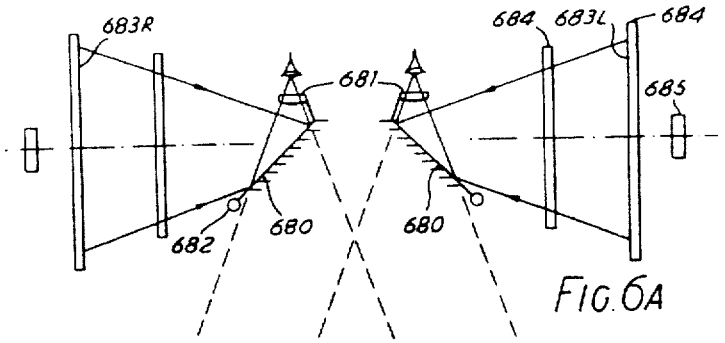
FIGS. 6A and 6B show schematic plan views of two configurations of a third embodiment of the invention.

FIG. 6 shows a third embodiment of the invention. This differs from the preceding embodiments in that the recorded images used therein may be opaque (generally, photographic prints), and in features allowing different modes of operation. There are two mirrors 680, each of which has an associated viewing lens system 681. The two mirrors are independently pivotable about pivots 682, together with the associated lenses, between configurations for direct viewing of a scene and for viewing a recorded image. FIG. 6A shows both mirrors in use for viewing recorded images 683, which images 683 are a stereo pair 683L and 683R. It will be seen that the mirrors 680 are at an angle, here 45°, to the optical axes common to the lenses 681 and the observer's eyes. The recorded images 683 are in planes parallel to these optical axes. The distances of the images 683 from the axes are variable coarsely by locating the images 683 in different image holders 684 (to allow images of different sizes to fill substantially all of the field of vision) and using lenses of different focal lengths; and finely by means of focusing controls 685.

Figure 6B:
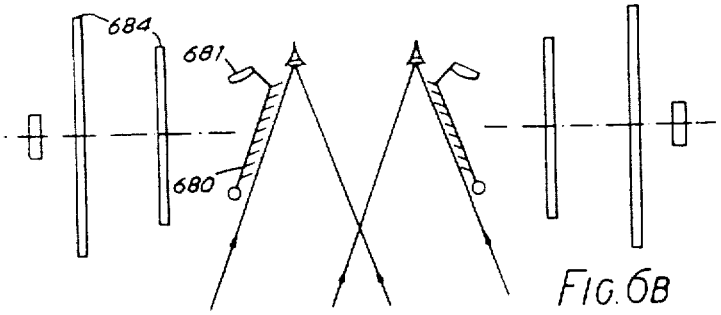

The pivoting of a mirror 680 with its lens system 681 from the configuration shown in FIG. 6A to that of FIG. 6B removes it from the observer's field of view. Thus he observes the actual scene in front of the viewer. While viewing the scene with both eyes (FIG. 6B) a recorded image 683 can be mounted in the view, and presented to one of the observer's eyes by pivoting of the associated mirror 680.

The images 683 are individually adjustable within the slots of the holders 684 for aligning them with the direct views. There are shutters (not shown) which automatically close during motion of the mirrors, which would otherwise tend to prevent comparison of recorded and direct views.

Each image 683 is a photograph laterally reversed in a Wheatstone's stereoscope.

Figure 7:
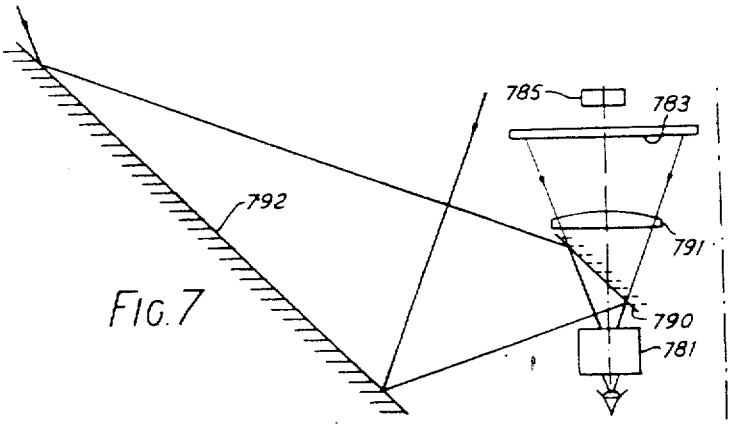
FIG. 7 is a schematic plan view of one half of a fourth embodiment.

FIG. 7 shows part of another embodiment which enables one eye to view either a recorded image or the actual scene. This employs a half-silvered mirror 790 at 45° to the optical axis of the observer's eye and a lens system 781. Behind the mirror 790 is a plano-convex lens 791, a recorded image 783, and a focusing system 785 for axial displacement of the image 783. Parallel to the half-silvered mirror 790 and laterally spaced from it there is a larger mirror 792 with a silvered front surface directed towards the front (towards the actual scene). Thus light from the scene is reflected from the larger mirror 792 and the mirror 790 through the lens system 781 and into the observer's eye. Light from the image 783 (reflected or transmitted depending on the nature of the image) is also passed to the observer's eye, via the lens 791, mirror 790 and lens system 781. The perception experienced by the observer depends on the amounts of light arriving by the two routes, which depend on the levels of illumination of the scene and the recorded image 783, and on the reflection/transmission efficiency of the mirror 790. There may be means for varying the level of illumination of the image 783 such that in a first level little or no light reaches the observer from it (so that he views only the actual scene); and in a second level the amount of light received by the observer swamps that coming from the actual scene (so that the image perceived is the recorded image 783). Alternatively or additionally, a level of illumination could be employed which leads to both images (of the actual scene and the recorded image) being seen by the observer, mutually superimposed. The levels of lighting required for these various effects will of course depend on the brightness of the actual scene. The illumination of the recorded image 783 may be electric, or may use ambient light (in which case variation can be achieved by the interposition of filters). The lens system 781 preferably provides measuring marks for use in in situ photogrammetry.

Analogously, an embodiment similar to that of FIG. 6 could employ half-silvered mirrors 680. (The lenses 681 would then have to be on the side of the mirrors remote from the eyes.) Thus, viewing of the scene with one eye or both, with or without superimposition of the recorded image(s), can be achieved by controlling illumination levels, and without the need for the mirrors to be pivotable. Alteration of the illuxination enables either or both the eyes to view selectively the scene, the recorded image(s), or the superimposed combination.

It should be stressed that even when an observer is using apparatus such as shown in FIGS. 6 and 7 to view two photographs, the fact that he is at the location for "live" viewing of the scene is known to his brain, and the surroundings blend into the recorded images. The psychological effect is much more lifelike than simply viewing a stereo pair of images in an unrelated location. And of course one or both eyes can be presented at will with the direct view.

Figure 8:
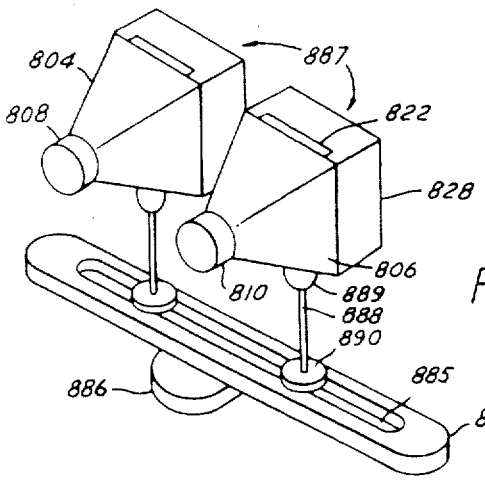
FIGS. 8 to 11 are perspective views of fifth, sixth, seventh and eighth embodiments.

FIG. 8 shows an embodiment more resembling those shown in FIGS. 2 to 5, and analogous elements have similar reference numerals in the 800's. The body 802 is a transversely extending bar having an elongate slot 885. On the underside of the bar there is a boss 886 having a threaded aperture (829, not shown) for mounting on a tripod.

Two independent viewer units 887 each comprise a frustopyramidal housing 804,806, and an eyepiece 808,810 which may include a lens system 820. At the front of each housing 804,806 is mounted a slide carrier 822 and a light diffuser 828. Each unit 887 is mounted to a leg 888 via a ball and socket joint 889. Each leg extends downwardly to a threaded portion which passes through the slot 885 in the body 802. Two flanges are threadedly engaged on each such threaded portion, one above (890) and one below the body 802, such that the lower flange can be loosened to allow the respective view unit 887 to be slid along the slot, and tightened to lock it in place.

The length of the slot 885 is such that if an observer is viewing with one eye through one unit 887 located adjacent a respective end of the slot, the other unit 887 can be slid out of the field of view of his other eye, which can then view the actual scene. A slide can be inserted in that other unit 887 which can then be slid into position for viewing.

Figure 9:
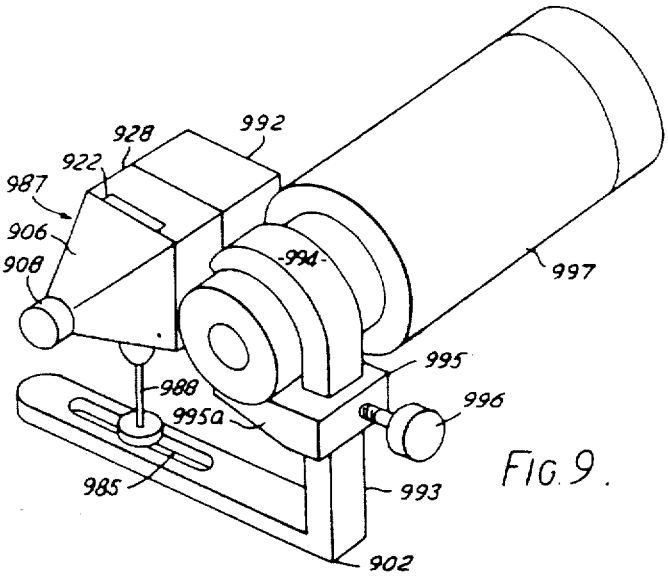

FIG. 9 shows another embodiment usable for telescopic viewing of distant scenes. Its left-hand half is almost identical to that of the FIG. 8 embodiment, consisting of a viewer unit 987 swivellably mounted on a leg 988 which is slidable in a slot 985 in the body 902. The unit 987 comprises a housing 906, an eyepiece 908, a slide carrier 922, and a diffuser 928. It is shown with an electrical lighting unit 992 mounted forwardly of the diffuser 928.

The slot 985 only extends over the left-hand portion of the body 902. The right-hand portion comprises an upright column 993 having a curved-over top portion 994. A collar 995 is slidably mounted on the column 993, and has a screw locking means 996 for controlling its sliding. The collar 995 has a leftwardly-extending portion 995a having an upwardly facing curved surface. This co-operates with the curved-over top portion 994 of the column 993 to clamp a telescopic viewer 997. This has a cylindrical body portion whose curvature corresponds to that of the curved engaging surfaces of the clamping arms (994,995a). Owing to the collar 995 being displaceable, the telescopic viewer 997 can be removed and used independently. The viewer 997 can have a zoom lens system (of variable focal length), so that it can be adjusted for use with recorded images taken with different degrees of magnification.

Figure 10:
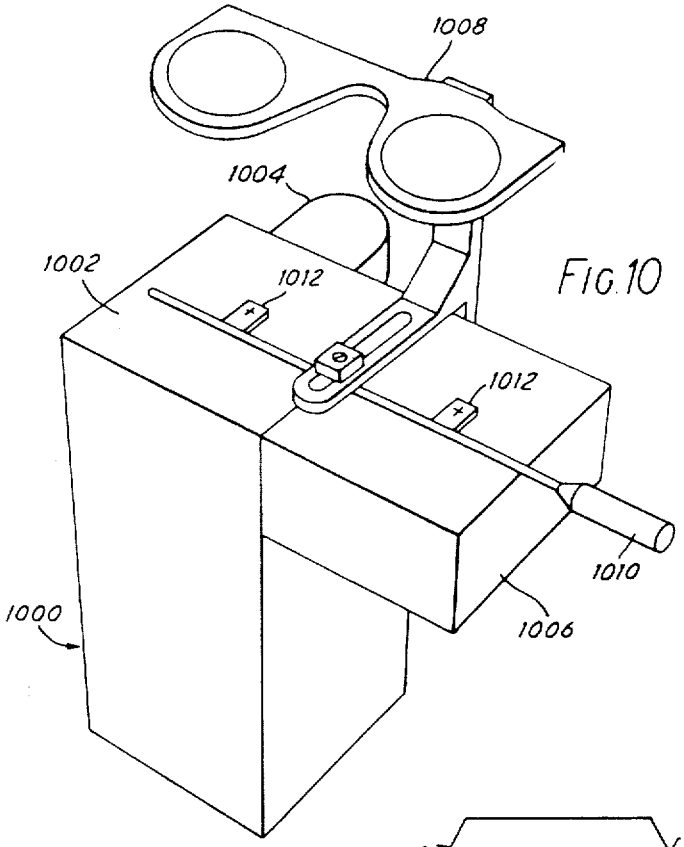

The embodiment of FIG. 10 is based on a reflex camera, a twin lens reflex camera being shown schematically at 1000. This has at the top a ground glass screen 1002 on which is displayable an image provided by the camera lens system 1004. Detachably mounted adjacent the screen 1002 is part 1006 of a slide viewer (comprising means for releasably mounting and illuminating a slide). A schematically illustrated binocular viewer 1008 is mounted adjustably for viewing the image on the screen 1002 with one eye, and the slide in the viewer part 1006 with the other. The whole is such that two correspondent images can be viewed and mentally fused by an observer.

On the upper surfaces of the screen 1002 and viewer part 1006 (which are coplanar) there is a parallax bar assembly 1010 of known type.

The apparatus may be used to gauge changes, e.g. in the width of a crack in a wall. For this purpose, a slide showing the wall at an earlier date is viewed, and fused with the "direct" view on the screen 1002. If there has been movement, e.g. opening of a crack, so that part of the wall is displaced from its recorded position, the fused view appears to show the displaced part either in front of or behind the plane of the undisplaced part.

The parallax bar assembly 1010 has two relatively displaceable crosses 1012, overlying the screen 1002 and the viewer 1006 respectively. When an observer fixes his attention on a point in the fused view, the two crosses 1012 will probably be seen indistinctly but separately. Their mutual spacing is then adjusted until they appear to merge into one. Their actual spacing is then characteristic of the apparent depth of the observed point in the fused view. If this operation is performed for points on either side of a crack, then the different separations required are indicative of opening or closing of the crack in the direction of the parallax bar 1010. The viewer part 1006 may then be detached and remounted at another side of the camera, at 90° to the original one. Repetition of the above gauging gives information relating to displacements along the other axis.

Preferably the ground glass screen 1002 is removable, since for some purposes it is preferable to view directly. Preferably there are means for intermittently occluding the image presented to either eye, for detecting differences between them. There may be means for feeding the images to the 'wrong' eyes, to produce a reversal of the normal 3-dimensional effects.

Instead of the parallax bar assembly, embodiments may use optical systems which provide adjustable reference marks, as in known stereo comparators, and as referred to in relation to lens system 781 above. Such embodiments may not employ reflex camera type optics, in which case a prism may be used to tilt the view on its side for gauging the vertical component of displacement.

For applications where measurements are not required, possibly after a binocular setting up procedure, a recorded image can be displayed on the same screen as the directly viewed scene. (The screen display can be of any type—e.g. projection or TV.) The two images are displayed alternately, so that differences can be detected.

It will be understood that the optical aspects of the illustrated embodiments are shown generally schematically. For example, the dimensions of lenses are unrealistic, and the refraction of light is not accurately shown. In many instances lens types and combinations other than those shown might be used. It is generally desirable to provide for adjustment of the focal lengths of the viewer lenses to facilitate precise matching of sizes of perceived images, and to compensate for individual eye anomalies. It is also desirable to provide means for controlling the amount of light received by an observer's two eyes, since bright light entering one eye causes contraction of the pupils of both.

Now that the structural forms of some practical embodiments of the invention have been described, some general governing principles will be discussed, and further fields of application of methods and apparatuses embodying the invention will be exemplified.

In general, the use of the invention involves an observer performing the mental operation of fusing individual images received by his eyes. Assuming that one of the images was recorded using a camera and the other is provided by direct viewing of the scene, the following conditions should be satisfied for perfect fusion:

(1) the straight line through the perspective centers of the observer's eyes passes through the position of the front nodal point of the camera lens used in recording the image;
(2) the two retinal images match each other in size, brightness and colour;
(3) the convergence-accommodation reflex of the eyes is not disturbed;
(4) direct vision is unobstructed over the photograph's field of view;
(5) all lenses are defect-free;
(6) the object has not changed since the photograph was taken.

Partial fusion can be accomplished even when condition (6) is far from being met—i.e. when the recorded image differs quite substantially from the actual scene as viewed directly. It is desirable that shadows on the scene should be subdued (or similar to those in the recorded image), and that there remain some unchanged features in widely-spaced regions of the recorded image.

Condition (1) is met when the directly-viewed image is viewed from the exact viewpoint at which the recordal of the image was made. As explained above, this can be achieved empirically by moving around while viewing until fusion is optimised).

Condition (2) (image-matching) is fulfillable by means including the use of colour film with good colour fidelity, and the presentation of the resulting image at the right size and brightness by use of a suitable viewing system, which preferably permits adjustment of both variables. The "actual scene" may be viewed through a lens system selected in dependence on the magnification of the viewing system for the recorded image. The recorded-image viewing system may provide variable magnification. It may be pointed out that the field of view of a 35 mm camera with an ordinary lens of focal length about 50 mm is very similar to that of the human eye. The actual camera lens used for recording an image may be suitable for viewing it, in which case the direct-viewing eye may be unaided.

The nature of the viewing system also determines whether conditions (3) and (4) can be met. Its permissible physical size and shape may be constrained by condition (4), unless means such as a periscope are provided to enable vision of the actual scene around the viewing system.

Some applications of the invention will now be outlined.

(a) Geological observations.

In a particular case, the movement of a landslip on a cliff face was being monitored over a period of many months by means of conventional observations of marker posts. It was found that one post was missing (perhaps having been torn out by vandals). Its former position was quickly and accurately established by superimposing a slide of the landslip area (taken with the post in place) with a direct view thereof. This was particularly valuable since otherwise the value of a lengthy project would have been much reduced. Furthermore, this observation technique much reduced the need for actual visits to the site, which were time-consuming and hazardous.

(b) Detection of crack movement.

Changes in cracks in buildings and in rocks can be of great importance. If a photograph showing a crack at one time is fused with a direct view of the scene, intermittent interruption of each image in turn causes any changes to "flicker". This makes their detection simple. The viewing systems may be provided with photogrammetric measuring marks (of known type), whose movement can be calibrated to enable measurements to be made. (c.f. FIG. 10)

Other changes, e.g. the deterioration in the stonework of a building, can also be detected. Changes in industrial plant—e.g. large pressure vessels—can be detected analogously.

(c) Fog studies.

Observations are made from a viewpoint above the level of the fog. Conventionally it is difficult to determine the extent of the fog, since few landmarks are visible. The invention enables a photograph taken in fog-free conditions to be fused with an actual view into the fog (so that the few visible landmarks fuse with their recorded selves). The extent of the fog can then be accurately gauged.

(d) Guiding under conditions of poor visibility.

Consider a craft moving in poor visibility—e.g. a boat sailing up a river at high tide and trying to follow a deep-water channel which is visible only at low tide. An observer can "fuse" his view of the craft with a photograph taken under conditions of good visibility, and then direct the craft to follow the correct course which he can "see". Similarly, night vision can be enhanced by fusion with a daylight image.

(e) "Public relations" etc.

A lifelike impression of the effect of some development on the appearance of a view can be obtained by superimposing on the view a "stereo-pair" of images which have been "retouched" to show the development. By means of an apparatus such as one of those shown in FIGS. 6 to 8 a "stereo-pair" of images, both of which have been retouched, can be viewed, and the retouched images can be replaced by direct vision of the actual scene.

(f) Orthoptics.

An amblyoscope is a known therapeutic device for exercising the faculty of binocular single vision. However, it is complex and expensive, and hence available for use only in an optical practitioner's establishment. By means of the present invention a sufferer can obtain a photograph taken in his own home—e.g. from his normal viewpoint when sitting in an armchair, and exercise his eyes by seeking to "fuse" the directly observed image with the recorded image.

(g) Three-dimensional viewing of television or projected films.

On a large screen, a "moving picture" is displayed and may be viewed as such as a normal 2-dimensional display. For 3-dimensional viewing, each observer is provided with his own viewer which provides a "stereo-pair" moving picture sequence for one of his eyes. For example, the "pairing" display may be fed along respective optical cables from a television display to the individual viewers. Alternatively, each viewer could have a miniature television set arranged to supply images to one eye.

Figure 11:
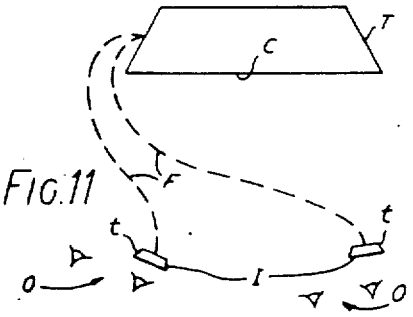

Such an embodiment is shown schematically in FIG. 11. Observers O each have an individual screen I for the right eye, while viewing a large communal screen C with the left eye. Screen C may belong to a generally conventional television set T. The individual screens I may be provided by miniature television sets t, or be fed by fibre optic cables F from a master screen which may be provided by the set T (separately from the screen S, since it must provide complementary stereo pairing images). In any case, each observer O can view an ordinary 2-dimensional display on the large screen C and, by applying a small screen I to one eye, can convert this to 3-dimensionality. The small screens I will generally be viewed through optical systems such that an observer's two eyes do not have to focus differently. The size of the image viewed on a screen I can be matched with that on the large screen C by simply moving the screen I towards or away from the screen C. Ihe screens I should be adjustable parallel to the screen C.

(h) Time delay.

One eye can view a changing image while the other is fed the same but delayed somewhat. Thus, for example, moving blips on a radar screen can easily be tracked.

(i) Police reconstructions

A photograph of the scene of a crime or accident (retouched if necessary) may show things no longer present at the actual scene. A witness then views the photograph at the scene and may fuse it with the direct view. This can give a very realistic reconstruction, which may serve to jog the memory of the witness.

Of course, the above list is not exhaustive, being given only by way of illustration. It will be appreciated by the skilled reader that many more embodiments and applications are within the scope of the invention. Features described with respect to particular ones may be combined with features of others. For example, means for intermittently occluding individual eye images are of wide utility, as are means providing movable reference marks on images.

While the above discussion has dealt primarily with images formed by visible light, it will be appreciated that this need not be so. (Of course, the images must ultimately be rendered detectable by an observer.) For example pictures obtained via an IR-detecting television camera could be fused with a directly-viewed scene. Alternatively, a night scene viewed by means of (e.g.) an IR detector can be fused with a picture of the scene in daylight. This greatly facilitates recognition of places in the night scene. Plainly there are applications to holography.

In a preferred modification of the FIG. 8 embodiment, at least one viewer unit 887 is pivotally mounted so that it can be flicked out of the way to allow direct viewing. It has positive location in the viewing position, so that the observer can easily compare 'direct' and 'indirect' views. The viewers may have second slide carriers 822' for receiving (e.g.) neutral density filters for matching.

There are many applications of the invention in the field of microscopy, particularly to photographic microscopy. Thus a photomicrograph taken under special conditions (e.g. showing luminescence) may be fused with a direct microscopic view, to enable identification of features seen in the photomicrograph.

Many operations now performed by conventional photogrammetry using stereo pairs of photographs (e.g. using the Porro-Koppe principle) are better performed by means of the invention, using one photograph and a direct view.

I claim:

1. A method for presenting first and second images derived from respective different sources to respective ones of an observer's eyes so that they can be substantially mentally fused to be perceived as a single mental image, wherein the method comprises: prerecording a first image *of at least a portion of a scene* to serve as a first image source; selecting *said scene as* a second, different image source for a second image so that said first and second images have substantial but not complete equivalence in visual content; *and* presenting said first image to the observer's first eye while simultaneously presenting to the observer's second eye said second image under conditions such that it matches the first image sufficiently for said substantial mental fusion to occur[; and subsequently interrupting the presentation of one of said images to a respective eye, the other image being visible to the other eye during said interruption; said interruption being effected externally of the observer].

2. A method according to claim 1 [wherein said first image is representative of at least a portion of a scene and wherein the step of presenting the images to the observer's eyes comprises enabling the observer to view the recorded image and said scene.] *further comprising subsequently interrupting the presentation of one of said images to a respective eye, the other image being visible to the other eye during said interruption, said interruption being effected externally of the observer.*

3. A method according to claim [2] *1* further comprising binocularly viewing the scene, immediately before said viewing of the recorded image and scene.

4. Viewing apparatus comprising first and second display means for presenting first and second images derived from respective different sources to respective ones of an observer's eyes so that they can be substantially mentally fused to be perceived as a single mental image, said first display means comprising means for [deriving said first image from a prerecorded image source,] *viewing a recorded image representing at least a substantial portion of a scene,* and said second display means *comprising means for viewing said scene and* being capable of presenting the second image under conditions such that it matches the first image sufficiently for said substantial mental fusion to be made; the apparatus further including means for optionally intermittently interrupting the presentation of one said image to a respective eye, the other image being visible to the other eye during said interruption.

5. Apparatus according to claim 4 wherein said intermittent interruption means is operable to interrupt the two images alternately.

6. Apparatus according to claim 4 having means for mounting the apparatus fixedly so as to prevent accidental movement relative to the image sources.

[7. Apparatus according to claim 4 wherein the first image display means comprises means for viewing a recorded image representing at least a substantial portion of a scene, and the second image display means comprises means for viewing said scene.]

* * * * *

UNITED STATES PATENT AND TRADEMARK OFFICE

CERTIFICATE OF CORRECTION

PATENT NO. : RE32,487

DATED : September 1, 1987

INVENTOR(S) : KALAUGHER, Patrick George

It is certified that error appears in the above-identified patent and that said Letters Patent is hereby corrected as shown below:

Title page, item [64], line 4, should read as follows:

-- Filed: Jan. 13, 1983 --

Signed and Sealed this

First Day of March, 1988

*Attest:*

*Attesting Officer*

DONALD J. QUIGG

*Commissioner of Patents and Trademarks*